United States Patent Office 3,816,415
Patented June 11, 1974

3,816,415
DERIVATIVES OF 1,7,7 - TRIMETHYL - 2 - NOR-BORNANE-2'-SPIRO-1',3'-DIOXOLANE
Claude P. Fauran, Paris, Jeannine A. Eberle, Chatou, Guy M. Raynaud, Paris, and Bernard M. Pourrias, Meudon-la-Foret, France, assignors to Delalande S.A., Courbevoie (Hauts-de-Seine), France
Claims priority, application France, Mar. 18, 1971, 7109448
Int. Cl. C07d 87/40
U.S. Cl. 260—247.7 E          7 Claims

ABSTRACT OF THE DISCLOSURE

Compounds of the formula

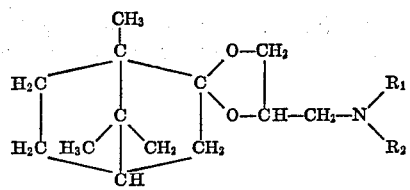

in which $R_1$ and $R_2$ are alkyls having 2 or 3 carbon atoms, or

is pyrrolidino, piperidino, morpholino or hexamethyleneimino are prepared by reacting camphor with epibromohydrin to form 4'-bromomethyl-1,7,7-trimethyl-2-norbornane-2'-spiro-1',3'-dioxolane, which is then reacted with

The compounds possess hypotensive, vasodilatory, spasmolytic, diuretic, analgesic, anti-inflammatory and antidepressive properties.

---

The present invention relates to novel derivatives of 1,7,7-trimethyl-2-norbornane-2'-spiro - 1',3' - dioxolane, their process of preparation and their therapeutic application.

The novel derivatives according to the invention correspond to the general formula:

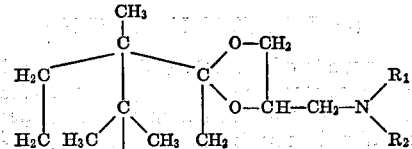         (I)

in which the group

represents:

a dialkylamino group in which the alkyl radicals comprise two or three carbon atoms, or
a heterocyclic radical selected from pyrrolidino, piperidino, morpholino and hexamethyleneimino.

The process according to the invention consists in condensing, in a first stage, camphor of formula:

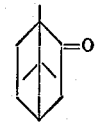         (II)

with epibromohydrin of formula:

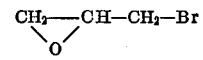         (III)

in the presence of $SnCl_4$, in carbon tetrachloride, and then condensing, in a second stage, the 4'-bromomethyl-1,7,7-trimethyl-2-norbornane-2'-spiro-1',4'-dioxolane obtained of formula:

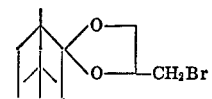         (IV)

separated by distillation, with an amine of formula:

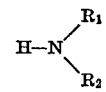         (V)

in which the group

has the same signification as in formula (I), this second condensation being carried out in a benzene medium.

The compounds of formula (I) are subsequently converted to the maleates.

The preparation of 4'-pyrrolidinomethyl-1,7,7-trimethyl-2-norbornane-2'-spiro-1',3'-dioxolane maleate is described hereafter by way of example to illustrate the invention.

1ST STAGE

Preparation of 4'-bromomethyl-1,7,7-trimethyl-2-norbornane-2'-spiro-1',3'-dioxolane (Code No. 70155)

0.2 mole of camphor, 0.26 mole of epibromohydrin and 160 ml. of $CCl_4$ are mixed in a 500 ml. reaction vessel provided with agitation means, a thermometer, a $CaCl_2$ cover and ampoule introduction means. The mixture is heated to 30° C. and a solution of 8 g. of $SnCl_4$ in 20 ml. of $CCl_4$ is added thereto over a period of 1 hour. The mixture is hydrolysed with a solution of 12 g. of soda in 60 ml. of water. The mixture is left for 3 hours, with agitation. Thereafter, the organic phase is decanted, washed with water until it is just neutral, dried over sodium sulfate, evaporated and recovered by distillation of the product obtained.
Boiling point=123° C. under 2 mm. Hg.
Yield=69.5%.

2ND STAGE

Preparation of 4'-pyrrolidinomethyl-1,7,7-trimethyl-2-norbornane-2'-spiro-1',3'-dioxolane (Code No. 70214)

0.3 mole of the bromo compound obtained from the first stage, 1.5 mole of pyrrolidine and 300 ml. of dry benzene are introduced into a 1 litre reaction vessel fitted with a refrigerated reflux, agitation means and a $CaCl_2$ cover. The reaction mixture is maintained under benzene reflux for 10 hours. The mixture is then cooled, treated with 0.3 mole of 2 N soda, decanted, extracted with ether, dried, evaporated and the product formed is distilled.
Boiling point=145–148° C. under 1 mm. Hg.
Yield=89%.

Empirical formula=$C_{17}H_{29}NO_2$.
Elementary analysis.—Calculated (percent): C, 73.07; H, 10.46. Found (percent): C, 72.52; H, 10.24.

3RD STAGE

Preparation of 4'-pyrrolidinomethyl-1,7,7-trimethyl-2-norbornane-2'-spiro-1',3'-dioxolane maleate 0.25 mole of compound No. 70214 prepared in the second stage is dissolved in acetone and the solution obtained is treated with 0.25 mole of maleic acid in acetonic solution with cooling. The solvent is evaporated and the residue is recrystallized from an ethyl acetate-isopropyl ether (60/40) mixture and the resultant product is dried.
Melting point=113° C.
Yield=83%.
Empirical formula=$C_{21}H_{33}NO_6$.
Elementary analysis.—Calculated (percent): C, 63.77; H, 8.61; N, 3.54. Found (percent): C, 63.81; H, 8.45; N, 3.73.

The compounds listed in the following Table I have been prepared by the same methods of operation.

of a guinea pig when said compounds are added in the perfusion liquid of said organ.

The results obtained with three of the compounds are given in the following Table III.

TABLE III

| Code No. of compound tested | Concentration in perfusion liquid | Percentage augmentation or coronary flow |
|---|---|---|
| 70 217 | 1 µg./ml./mn. | 35 |
| 70 218 | 2.5 µg./ml./mn. | 20 |
| 70 229 | 2.5 µg./ml./mn. | 30 |

(3) SPASMOLYTIC PROPERTIES

The compounds of formula (I), introduced into the conserving medium, are capable of opposing the contractural action of barium chloride on the isolated duodenum

TABLE I

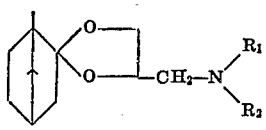

| Code No. | $-N\begin{smallmatrix}R_1\\R_2\end{smallmatrix}$ | Form | Empirical formula | Molecular weight | Boiling point, °C./mm. Hg | Melting point, °C. | Yield, percent | Calculated | | | Found | | |
|---|---|---|---|---|---|---|---|---|---|---|---|---|---|
| | | | | | | | | C | H | N | C | H | N |
| 70213 | —N◯O | Base | $C_{17}H_{29}NO_3$ | 295.41 | 143/0.3 | | 59 | 69.11 | 9.90 | | 68.76 | 9.75 | |
| | | Maleate | $C_{21}H_{33}NO_7$ | 411.48 | | 133 | 78 | 61.29 | 8.08 | 3.40 | 61.50 | 7.85 | 3.61 |
| 70217 | —N◯ | Base | $C_{19}H_{33}NO_2$ | 307.46 | 170/0.3 | | 74 | 74.22 | 10.82 | | 74.68 | 10.72 | |
| | | Maleate | $C_{23}H_{37}NO_6$ | 423.53 | | 117 | 86 | 65.22 | 8.81 | 3.31 | 65.43 | 8.89 | 3.48 |
| 70218 | —N(C₂H₅)₂ | Base | $C_{17}H_{31}NO_2$ | 281.43 | 133/0.8 | | 61 | 72.55 | 11.10 | | 72.42 | 10.76 | |
| | | Maleate | $C_{21}H_{35}NO_6$ | 397.50 | | 90 | 70 | 63.45 | 8.88 | 3.53 | 63.29 | 8.93 | 3.69 |
| 70229 | —N◯ | Maleate | $C_{22}H_{35}NO_6$ | 409.51 | | 130 | 85 | 64.52 | 8.62 | 3.42 | 64.66 | 8.77 | 3.60 |
| 70295 | —N(C₃H₇)₂ | Base | $C_{19}H_{35}NO_2$ | 309.48 | 135/0.5 | | 67.5 | | | | | | |
| | | Maleate | $C_{23}H_{39}NO_6$ | 425.55 | | | 69 | 64.91 | 9.24 | 3.29 | 64.98 | 9.37 | 3.15 |

The compounds of formula (I) have been studied on animals in the laboratory and have been shown to possess hypotensive, vasodilatatory, spasmolytic, diuretic, analgesic, anti-inflammatory and antidepressive properties.

(1) HYPOTENSIVE PROPERTIES

Administered by intravenous means on the anaesthetized rat, the compounds of formula (I) provoke a lowering of the arterial pressure.

The results obtained with a certain number of the compounds are given in the following Table II:

TABLE II

| Code No. | Dose administered | Lowering of arterial pressure | |
|---|---|---|---|
| | | Percentage | Duration |
| 70 213 | 1 mg./kg./IV | 45 | >60 mn. |
| 70 217 | 2 mg./kg./IV | 30 | >20 mn. |
| 70 218 | 1 mg./kg./IV | 60 | >30 mn. |
| 70 229 | 1 mg./kg./IV | 40 | >30 mn. |
| 70 295 | 1 mg./kg./IV | 25 | >30 mn. |

(2) VASODILATATORY PROPERTIES

The compounds of formula (I) are capable of augmenting the flow of the coronary vessels of the isolated heart of the rat. This activity is evaluated by taking papaverine as standard.

By way of example, the spasmolytic activity of compound Nos. 70214, 70217 and 70229 is equivalent to that of papaverine, whilst that of compound No. 70218 is equal to half that of papaverine.

(4) DIURETIC PROPERTIES

The compounds of formula (I), administered by oral means to the mouse simultaneously with a volume of 1 ml. of an isotonic solution of sodium chloride per 25 g. of the corporeal weight of the mouse, are capable of provoking an augmentation of the volume of urine emitted by reference to control animals, the volume being measured for 4 hours following administration.

By way of example, with a dose of 10 mg./kg./PO, compound Nos. 70214, 70218 and 70229 respectively augment the diuresis by 65%, 65% and 75%.

(5) ANALGESIC PROPERTIES

The compounds of formula (I), administered by oral means on the mouse, are capable of reducing the number of painful stretchings prdoduced by the intraperitoneal injection of acetic acid.

The results obtained with a certain number of compounds are given in the following Table IV:

TABLE IV

| Code No. of compound tested | Dose administered | Percentage diminution of number of painful stretchings |
| --- | --- | --- |
| 70 213 | 100 mg./kg./PO | 50 |
| 70 214 | 50 mg./kg./PO | 40 |
| 70 218 | 50 mg./kg./PO | 60 |
| 70 229 | 50 mg./kg./PO | 45 |
| 70 295 | 100 mg./kg./PO | 70 |

(6) ANTI-INFLAMMATORY PROPERTIES

These properties are shown by a reduction of the underplanatary oedema provoked by the local injection of a phlogogenic agents, such as carraghenin, to a rat following oral administration thereto the compounds of formula (I).

By way of example, a reduction of 45% of the underplanatary oedema is obtained by administration of 200 mg./kg./PO of compound No. 70213 or 50 mg./kg./PO of compound No. 70214 or 70229.

(7) ANTIDEPRESSIVE PROPERTIES

The compounds of formula (I), preventatively administered by oral means to the mouse, are capable of opposing the ptosis provoked by the injection of reserpine.

By way of example, the administration of 50 mg./kg./PO of compound No. 70214 reduces the ptosis by 40%.

On can see from the results shown above and those shown in the following Table V, the difference between the pharmacologically active dose and the lethal dose is sufficiently great to permit the compounds of formula (I) to be used in therapeutics.

TABLE V

| Code No. of compound tested | Toxicity to the mouse | |
| --- | --- | --- |
| | Dose administered | Percentage mortality |
| 70 213 | 2,000 mg./kg./PO | 0 |
| 70 214 | 1,200 mg./kg./PO | ≃50 |
| 70 217 | 750 mg./kg./PO | ≃50 |
| 70 218 | 850 mg./kg./PO | ≃50 |
| 70 229 | 750 mg./kg./PO | ≃50 |
| 70 295 | 1,000 mg./kg./PO | ≃50 |

The compounds of formula (I) are useful in the treatment of hypertensions, circulatory insufficiencies, odemas, painful inflammations and others and in that of depressions.

They may be administered by oral means in the form of tablets, dragées, and gelules containing 50 to 200 mg. of active ingredient (3 to 5 times a day), by parenteral means in the form of ampoules containing 10 to 100 mg. of active ingredient (1 to 2 times a day) and by rectal means in the form of suppositories containing 25 to 150 mg. of active ingredient (1 to 2 times a day).

Accordingly, the present invention also relates to a therapeutic composition comprising a compound of the general formula (I) together with a therapeutically acceptable carrier.

What we claim is:
1. A compound of the formula

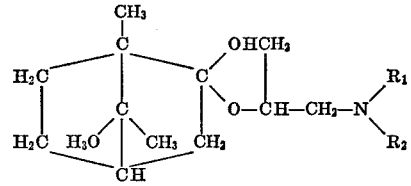

in which
$R_1$ and $R_2$ are alkyls having 2 or 3 carbon atoms, or

is pyrrolidino, piperidino, morpholino or hexamethyleneimino
and the pharmacologically acceptable acid addition salts thereof.

2. A compound as claimed in claim 1, in which $R_1$ and $R_2$ are ethyl.

3. A compound as claimed in claim 1, in which $R_1$ and $R_2$ are propyl.

4. A compound as claimed in claim 1, in which

is pyrrolidino.

5. A compound as claimed in claim 1, in which

is piperidino.

6. A compound as claimed in claim 1, in which

is morpholino.

7. A compound as claimed in claim 1, in which

is hexamethyleneimino.

References Cited
UNITED STATES PATENTS 3,641,039  2/1972  Rakoczi et al. _____ 260—292
3,654,357  4/1972  Bretschneider et al. _ 260—552 R
3,707,558  12/1972  Bretschneider et al.
                                        260—556 AC

OTHER REFERENCES

Chem. Abstracts, 64:9552a (1966).

HENRY R. JILES, Primary Examiner

G. T. TODD, Assistant Examiner

U.S. Cl. X.R.

260—293.56, 326.5 D, 340.9; 424—244, 248, 267, 274, 278

UNITED STATES PATENT OFFICE
CERTIFICATE OF CORRECTION

Patent No. 3,816,415         Dated June 11, 1974

Inventor(s) Claude P. Fauran, Jeannine A. Eberle, Guy M. Raynaud and Bernard M. Pourrias It is certified that error appears in the above-identified patent and that said Letters Patent are hereby corrected as shown below:

Col. 6, line 5; correct the formula to read as follows:

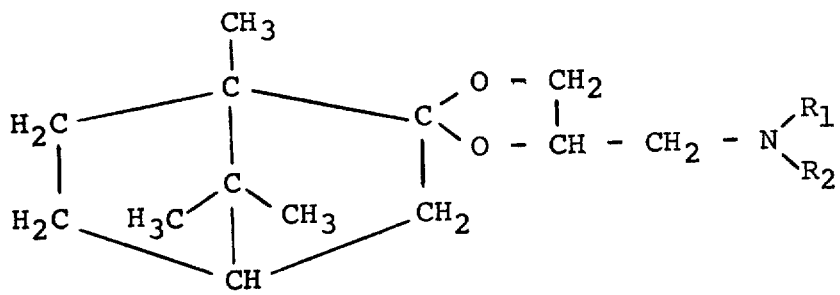

Signed and sealed this 1st day of October 1974.

(SEAL)
Attest:

McCOY M. GIBSON JR.
Attesting Officer

C. MARSHALL DANN
Commissioner of Patents